US012427086B1

(12) United States Patent
Brown

(10) Patent No.: US 12,427,086 B1
(45) Date of Patent: Sep. 30, 2025

(54) STEAM ROOM AND SAUNA EMERGENCY MONITORING SYSTEM AND APPARATUS

(71) Applicant: R. David Brown, Palm Springs, CA (US)

(72) Inventor: R. David Brown, Palm Springs, CA (US)

( * ) Notice: Subject to any disclaimer, the term of this patent is extended or adjusted under 35 U.S.C. 154(b) by 0 days.

(21) Appl. No.: 19/280,434

(22) Filed: Jul. 25, 2025

(51) Int. Cl.
*A61H 33/06* (2006.01)

(52) U.S. Cl.
CPC ... *A61H 33/065* (2013.01); *A61H 2201/0184* (2013.01); *A61H 2201/5058* (2013.01); *A61H 2230/065* (2013.01); *A61H 2230/625* (2013.01)

(58) Field of Classification Search
CPC .......... A61H 33/065; A61H 2201/0184; A61H 2201/5058; A61H 2230/065; A61H 2230/625
USPC ........... 4/524, 535; 607/1, 81, 83; 126/350.2
See application file for complete search history.

(56) References Cited

U.S. PATENT DOCUMENTS 6,736,831 B1 * 5/2004 Hartmann ............ A61N 5/1043 607/2
6,772,026 B2 * 8/2004 Bradbury ........... G06Q 30/0601 700/98
7,460,906 B2 * 12/2008 Libbus ................. A61N 1/3627 607/9
7,483,743 B2 * 1/2009 Mann ................. A61B 5/02108 607/2
7,630,760 B2 * 12/2009 Libbus ............... A61N 1/36031 607/2
7,640,062 B2 * 12/2009 Shalev ............... A61N 1/36082 607/45
7,769,465 B2 * 8/2010 Matos .................. A61N 1/0476 607/30
8,116,864 B2 * 2/2012 Covey .................. A61N 1/0492 607/2
8,175,705 B2 * 5/2012 Libbus ............... A61N 1/36114 607/9

(Continued)

FOREIGN PATENT DOCUMENTS

CN 107427686 B * 10/2021 ........... A61N 1/3993
EP 1594105 A1 * 11/2005 ............. G16Z 99/00

(Continued)

*Primary Examiner* — Lori L Baker
(74) *Attorney, Agent, or Firm* — The Rapacke Law Group, P.A.

(57) ABSTRACT

A system for monitoring and responding to medical emergencies in high-humidity environments includes a processor, a memory storing computer-executable instructions, and a sensor array comprising motion detection, fall detection, and vital signs monitoring. The sensor array includes a steam-adaptive calibration configured to adjust detection thresholds based on vapor density and humidity levels. A privacy-preserving architecture processes non-identifiable inputs such as motion signatures, radar signals, or acoustic triggers without storing visual or audio recordings. When inactivity, collapse, or absence of respiration is detected for a predefined threshold period, the privacy-preserving architecture initiates a first notification to staff interface and response tools. If the first notification is not acknowledged within a predetermined escalation period, a secondary notification is transmitted. The system operates in real time to provide emergency alerts while preserving occupant privacy.

20 Claims, 7 Drawing Sheets

(56) References Cited

U.S. PATENT DOCUMENTS

| | | | | |
|---|---|---|---|---|
| 8,386,053 | B2 * | 2/2013 | Kornet | A61N 1/36114 607/116 |
| 8,489,207 | B1 * | 7/2013 | Vaisnys | A61N 1/3993 607/30 |
| 8,515,548 | B2 * | 8/2013 | Rofougaran | H04L 12/6418 607/2 |
| 8,676,324 | B2 * | 3/2014 | Simon | A61N 1/40 607/139 |
| 8,676,330 | B2 * | 3/2014 | Simon | A61N 1/0456 607/139 |
| 8,827,904 | B2 * | 9/2014 | Ball | G16H 40/67 600/300 |
| 8,996,125 | B2 * | 3/2015 | Greiner | A61N 1/36114 607/116 |
| 10,245,437 | B2 * | 4/2019 | Kantor | A61M 16/0003 |
| 10,667,717 | B2 * | 6/2020 | Freeman | A61B 5/086 |
| 11,052,241 | B2 * | 7/2021 | Gustavson | A61B 5/002 |
| 11,331,505 | B2 * | 5/2022 | Chang | A61B 5/6833 |
| 2002/0082644 | A1 * | 6/2002 | Picardo | A61N 1/0472 607/1 |
| 2004/0138647 | A1 * | 7/2004 | Osorio | A61N 1/37235 604/890.1 |
| 2013/0030257 | A1 * | 1/2013 | Nakata | G01S 13/87 600/407 |
| 2013/0282069 | A1 * | 10/2013 | Thiagarajan | A61N 1/3993 607/3 |
| 2014/0194793 | A1 * | 7/2014 | Nakata | A61N 1/36031 601/48 |
| 2016/0256700 | A1 * | 9/2016 | Peterson | G16H 40/63 |
| 2022/0054849 | A1 * | 2/2022 | Engman | A61N 1/3968 |
| 2023/0238127 | A1 * | 7/2023 | Oplinger | A61N 1/372 607/1 |

FOREIGN PATENT DOCUMENTS

| | | | | | |
|---|---|---|---|---|---|
| JP | 2005319306 | A | * | 11/2005 | G16Z 99/00 |
| JP | 2007244879 | A | * | 9/2007 | A61H 31/007 |
| JP | 2012075936 | A | * | 4/2012 | A61N 1/39044 |
| WO | WO-2016081381 | A1 | * | 5/2016 | A61H 31/006 |
| WO | WO-2021207094 | A1 | * | 10/2021 | A61K 31/352 |

* cited by examiner

STEAM ROOM AND SAUNA EMERGENCY MONITORING SYSTEM AND APPARATUS

TECHNICAL FIELD

The embodiments disclosed herein generally relate to systems and methods for emergency detection and response in high-humidity wellness environments.

BACKGROUND

Conventional safety monitoring systems have been developed for a variety of indoor environments, including residential bathrooms, assisted living facilities, and general healthcare settings. These systems often rely on wearable devices or strategically placed cameras to detect falls, monitor inactivity, or assess movement patterns. In some cases, systems incorporate microphones to detect distress sounds or alarms. Many such solutions are designed to alert caregivers or facility personnel in real time through mobile applications, alarm panels, or automated call systems.

In certain commercial and residential applications, safety systems may include floor-based pressure sensors, camera-based motion tracking, or wearable accelerometers that detect abrupt movement or impact. These systems typically function well in controlled environments with stable temperature and humidity conditions. Some systems integrate with centralized dashboards to provide staff with status updates and notification histories, allowing for auditability and response tracking.

However, conventional monitoring technologies often experience reliability challenges in high-humidity or high-temperature environments, such as steam rooms or dry saunas. Moisture can interfere with sensor accuracy, and elevated heat levels may degrade electronic components over time. Additionally, privacy concerns limit the use of video and audio surveillance in settings where individuals may be partially or fully unclothed. These factors can reduce the effectiveness of traditional safety systems in spa and wellness environments, where discrete, durable, and accurate monitoring tools are especially important.

SUMMARY OF THE INVENTION

This summary is provided to introduce a variety of concepts in a simplified form that is further disclosed in the detailed description of the embodiments. This summary is not intended for determining the scope of the claimed subject matter.

A system for emergency monitoring and response in high-humidity environments includes a non-contact, sensor-integrated software architecture configured to detect inactivity, falls, and respiration loss within enclosed spaces such as steam rooms and dry saunas. The system features real-time data processing, environmental calibration, and intelligent alerting protocols that support rapid staff response while preserving occupant privacy.

The system operates by receiving input from a plurality of non-contact sensors, including motion detectors, fall detection sensors, and respiration monitors. These sensor inputs are processed by a software module that cross-references data streams to reduce false positives and confirm potential medical emergencies. Environmental variables such as vapor density and humidity are dynamically monitored by a calibration module that adjusts detection thresholds in real time, allowing for reliable performance even in dense steam conditions.

A software-based alert module initiates an initial notification to designated staff interfaces when emergency conditions are detected. If the notification is not acknowledged within a predetermined timeframe, an escalation module transmits a secondary alert to management-level devices or facility-wide systems. A voice-prompt subroutine may activate locally to query occupant responsiveness before escalation occurs, supporting user recovery and reducing unnecessary alarms.

The system includes a privacy-preserving logic module that intentionally excludes the use of cameras, microphones with audio retention, or other identifiable tracking mechanisms. Instead, the software processes radar, thermal, and acoustic energy data in a form that cannot be reconstructed into personally identifiable information. This design ensures that emergency monitoring is achieved without compromising the privacy expectations typical in wellness and spa environments.

Additional software functionality includes session monitoring and time-based safety limits that notify staff or users when occupancy exceeds predefined durations. The system also logs anonymized event data, staff responses, and alert resolution timestamps, allowing for internal auditability and compliance tracking. These features provide spa and wellness facilities with an effective, non-invasive emergency response tool specifically adapted for extreme humidity and heat conditions where traditional systems are unreliable.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

The detailed description set forth below is intended as a description of various configurations and is not intended to represent the only configurations in which the disclosed system or method may be practiced. The terminology used herein is for the purpose of describing particular implementations only and is not intended to be limiting.

In the following description, specific details are set forth to provide a thorough understanding of the disclosed subject matter. However, it will be apparent to those skilled in the art that the disclosed subject matter may be practiced without these specific details. In other instances, well-known structures and components are shown in block diagram form to avoid obscuring relevant details. References to various features are intended to encompass variations that perform substantially the same function in substantially the same way to achieve substantially the same result.

While the drawings illustrate various components as discrete blocks or systems for clarity, it will be appreciated that such illustrations are conceptual and do not necessarily reflect the modular or integrated nature of actual implementations. Functionalities described in connection with specific system components or steps may be combined, subdivided, or reordered depending on the context or use case.

Figure 1:
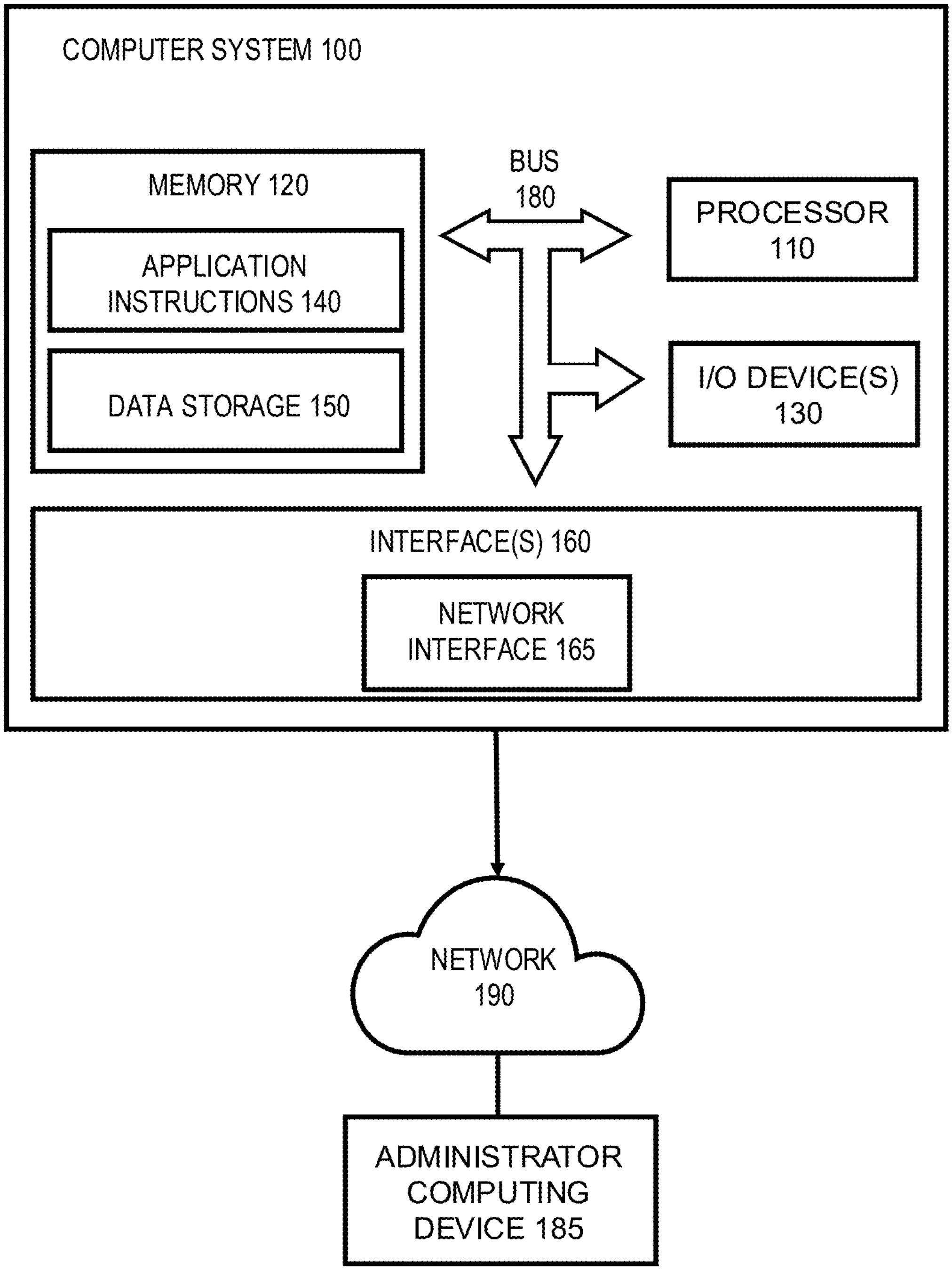
FIG. 1 illustrates an example computing environment suitable for implementing components of the system.
Figure 2:
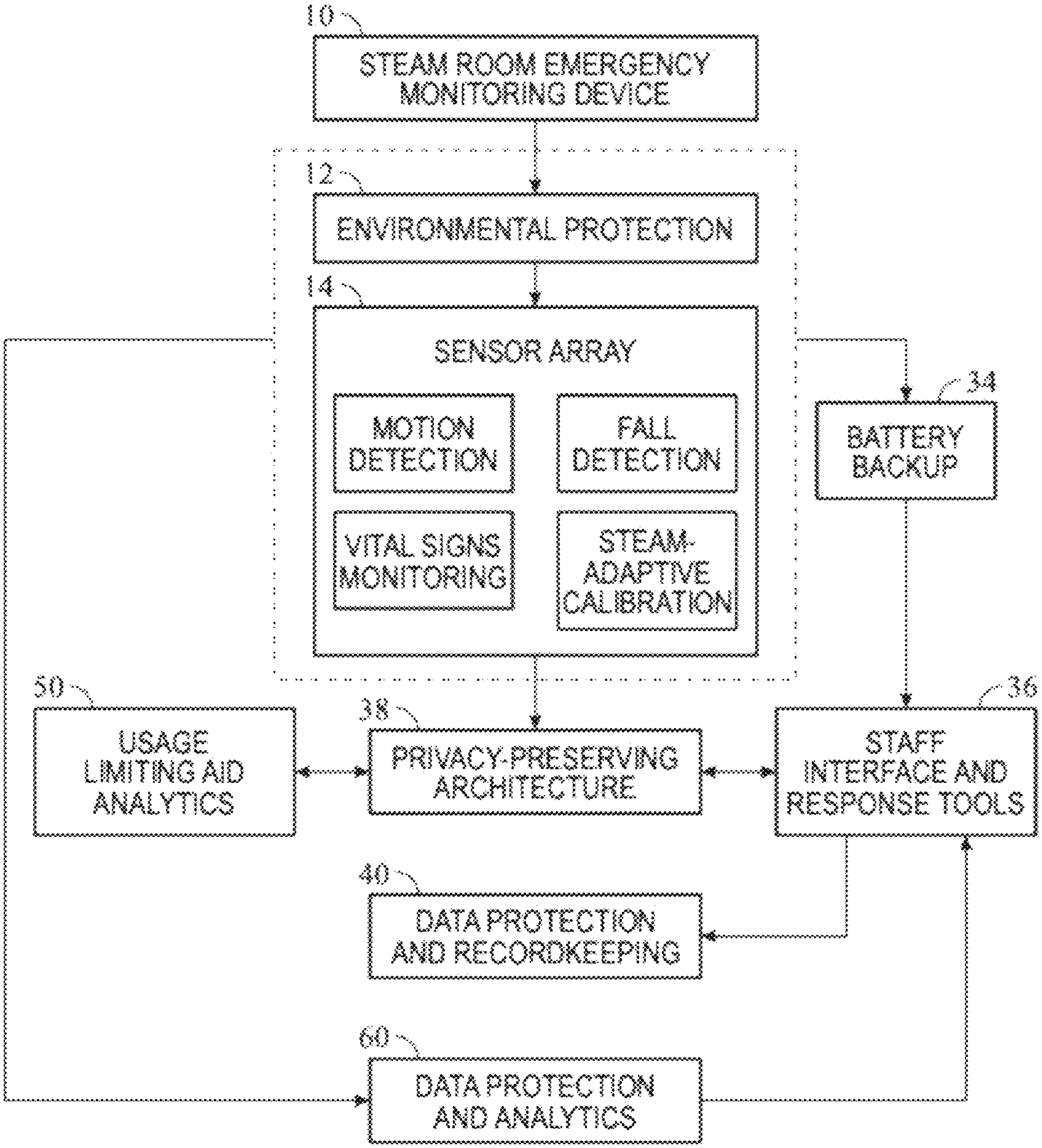
FIG. 2 illustrates a block diagram and process flow of a steam room emergency monitoring system.

With reference to FIG. 1 and FIG. 2, the following components and corresponding reference numerals are used throughout this specification to describe the structure and operation of the disclosed system. Steam room emergency monitoring device 10 refers to the overall emergency detection and response system configured for high-humidity environments. Environmental protection module 12 represents a sealed, heat- and vapor-resistant enclosure that houses sensitive electronics. Sensor array 14 includes motion detection module 14*a*, fall detection module 14*b*, vital signs monitoring module 14*c*, and steam-adaptive calibration module 14*d*. The motion detection module 14*a* may comprise radar, passive infrared, or ultrasonic sensors. Fall detection module 14*b* may include lidar or directional accelerometers. Vital signs monitoring module 14*c* may detect respiration using radar-based micro-movement analysis or thermal sensing. Steam-adaptive calibration module 14*d* dynamically adjusts detection thresholds based on environmental parameters such as humidity and steam opacity. Battery backup 34 provides uninterrupted power in the event of main supply failure. Staff interface and response tools 36 may include a dashboard, mobile application, or terminal used by personnel to view and respond to alerts. Privacy-preserving architecture 38 includes system logic and software that interprets sensor signals without collecting or storing visual or audio recordings. Data protection and recordkeeping module 40 logs alerts, responses, and timestamps for traceability. Usage limiting aid analytics module 50 monitors occupant session time and triggers time-based alerts. Data protection and analytics module 60 aggregates anonymized operational data for reporting and compliance review. Computer system 100 represents the general computing infrastructure implementing the monitoring and alert logic. Processor 110 executes emergency detection algorithms. Memory 120 stores application instructions and runtime parameters. I/O devices 130 may include speakers, LEDs, or buzzers used for system prompts and alert feedback. Application instructions 140 include non-transitory computer-readable logic used to perform monitoring functions. Data storage 150 maintains local or cloud-based storage for event logs and configuration data. Interfaces 160 facilitate internal and external communication between modules. Network interface 165 enables data transmission over Ethernet, Wi-Fi, or LTE. Bus 180 is the data interconnect that links processing and peripheral components within computer system 100. Administrator computing device 185 refers to any staff-facing device that displays alerts and session status. Network 190 provides the communications infrastructure supporting notifications, remote logging, and administrative access.

FIG. 1 illustrates computer system 100, which may be configured to monitor and respond to medical emergencies in high-humidity environments by executing one or more software components responsible for sensor calibration, privacy-preserving signal processing, and staff notification workflows. Computer system 100 may include processor 110, memory 120, application instructions 140, data storage 150, interface(s) 160, network interface 165, I/O device(s) 130, and bus 180, each of which may be interconnected to facilitate system operations. Computer system 100 may also be communicatively coupled with network 190 and administrator computing device 185 to support alert delivery and response tracking.

Processor 110 may comprise one or more computing components capable of executing computer-executable instructions. These may include a central processing unit (CPU), a digital signal processor (DSP), a graphics processing unit (GPU), or a combination thereof. Processor 110 may be configured to retrieve and execute application instructions 140 from memory 120 to implement system functionality such as real-time monitoring, calibration adjustments, signal interpretation, alert triggering, and escalation routines.

Memory 120 may comprise one or more types of volatile or non-volatile memory devices such as static RAM (SRAM), dynamic RAM (DRAM), flash memory, or other memory modules. Memory 120 may store application instructions 140, which define the programmatic logic executed by processor 110, and may also temporarily or persistently store operating parameters, user preferences, or sensor thresholds used by the system. Data storage 150 may be a distinct memory region or separate device configured to store event logs, calibration profiles, anonymized alert records, or operational status data. Data storage 150 may be implemented using a solid-state drive (SSD), hard disk drive (HDD), or embedded flash memory.

Application instructions 140 may include logic necessary to implement the privacy-preserving architecture, staff interface and response tools, usage limiting aid analytics, steam-adaptive calibration, and alert escalation procedures. When executed by processor 110, application instructions 140 may receive and interpret sensor data from connected detection subsystems, apply environmental calibration thresholds, and coordinate alert output and escalation behaviors according to predefined rules stored in memory 120 or data storage 150.

I/O device(s) 130 may include components configured to generate system outputs or receive manual diagnostic inputs. These may include LED indicators, buzzers, onboard speakers for emitting voice prompts, or diagnostic ports for maintenance purposes. I/O device(s) 130 may be controlled by processor 110 and configured to activate in response to specific triggers or system states, such as initiating a local audible prompt or displaying status during fault recovery.

Interface(s) 160 may facilitate data exchange between internal subsystems and external networked devices. Network interface 165 may be a dedicated hardware component or a logical software-defined interface configured to transmit and receive data via network 190. Network interface 165 may use communication protocols such as Ethernet, Wi-Fi, LTE, or other wireless or wired standards. Network interface 165 may transmit alert data, status updates, and event logs to administrator computing device 185 and may also receive configuration updates or acknowledgment signals in return.

Bus 180 may comprise a data interconnect system configured to enable communication between processor 110, memory 120, I/O device(s) 130, interface(s) 160, and other internal components of computer system 100. Bus 180 may be implemented using one or more hardware data buses or system-on-chip interconnects that facilitate high-speed data transfer between modules.

Network 190 may be any communication medium enabling data transfer between computer system 100 and administrator computing device 185. Network 190 may include a local area network (LAN), wide area network (WAN), cellular network, or cloud-based infrastructure. Communication over network 190 may be secured using encryption protocols to protect alert data and session records.

Administrator computing device 185 may be a local or remote computing endpoint such as a desktop computer, tablet, or dedicated terminal accessible by facility personnel. Administrator computing device 185 may be configured to execute a staff interface and response tools module that receives, displays, and allows acknowledgment of alerts generated by the privacy-preserving architecture. Administrator computing device 185 may present alert metadata including incident type, timestamp, and acknowledgment status, and may provide response options such as alert dismissal, escalation override, or follow-up logging.

FIG. 2 illustrates a steam room emergency monitoring device 10 comprising a set of interrelated subsystems configured to detect, process, and respond to medical emergencies occurring in high-humidity environments. The steam room emergency monitoring device 10 may be installed in a fixed location within a steam room or dry sauna and may function without requiring user interaction or wearable components. The steam room emergency monitoring device 10 includes an environmental protection module 12 configured to shield internal electronics and sensor components from high-temperature, high-moisture operating conditions. The environmental protection module 12 may comprise a sealed enclosure fabricated from heat-resistant, corrosion-resistant materials and may include one or more gaskets, coatings, or membrane layers to prevent water ingress while maintaining sensor transparency to motion, radar, or thermal signals.

Enclosed within the environmental protection module 12, the sensor array 14 may be configured to acquire multi-modal detection data in real time. The sensor array 14 includes multiple non-contact sensors designed to monitor physiological and behavioral indicators within the monitored environment. The motion detection module within the sensor array 14 may include passive infrared sensors, radar-based Doppler sensors, or time-of-flight sensors configured to detect occupant movement or its cessation over time. The motion detection module may continuously monitor for signs of user activity and may transmit a signal to the privacy-preserving architecture 38 when motion drops below a predefined threshold for a configurable duration.

The fall detection module within the sensor array 14 may utilize a combination of short-range radar, lidar, or directional accelerometer arrays configured to detect rapid vertical displacement consistent with a collapse event. In some implementations, the fall detection module may compare height profiles or object trajectories against preset parameters to distinguish between normal activity and fall-like behavior. When the fall detection module determines a collapse may have occurred, the sensor array 14 may generate an alert signal routed to the privacy-preserving architecture 38.

The vital signs monitoring module within the sensor array 14 may be configured to detect physiological micro-movements, such as chest wall expansion during respiration. The vital signs monitoring module may employ frequency-modulated continuous-wave radar or thermal imaging techniques that measure displacement or temperature variation over time. If respiratory activity is not detected for a predefined threshold interval, the vital signs monitoring module may transmit a non-responsiveness signal to the privacy-preserving architecture 38 for further action.

The steam-adaptive calibration module within the sensor array 14 may be configured to interpret environmental variables such as vapor density and ambient humidity levels. The steam-adaptive calibration module may receive input from embedded humidity sensors or optical opacity sensors and may dynamically adjust signal sensitivity, detection thresholds, or sampling frequency across the other sensor modules. For example, when steam density increases, the steam-adaptive calibration module may lower the sensitivity of the motion detection module to account for ambient signal noise, thereby reducing false positives. Adjusted parameters may be stored temporarily in memory and may be recalibrated on a rolling basis.

The sensor array 14 may be electrically connected to a privacy-preserving architecture 38, which may be a software module configured to receive sensor inputs and determine whether an alert condition has been met. The privacy-preserving architecture 38 may operate without storing any visual or audio recordings and may exclude the use of cameras or identifiable surveillance technologies. Instead, the privacy-preserving architecture 38 may process signal metadata such as motion signatures, radar returns, thermal patterns, or acoustic energy bursts using onboard logic to detect indicators of a medical emergency. The privacy-preserving architecture 38 may include embedded logic to determine whether inactivity, collapse, or absence of respiration has been observed for a threshold duration and may initiate alert notifications accordingly.

The privacy-preserving architecture 38 may initiate an alert sequence by transmitting a signal to the staff interface and response tools 36. The staff interface and response tools 36 may include a dashboard, graphical display, or mobile alert platform configured to present event metadata, including room location, alert type, and elapsed time since last detected activity. The staff interface and response tools 36 may support interactive features that allow a staff member to acknowledge, escalate, or dismiss alerts. In some configurations, the privacy-preserving architecture 38 may also trigger an audible voice prompt or status tone within the steam room emergency monitoring device 10 to prompt occupant responsiveness before alert escalation proceeds.

The staff interface and response tools 36 may also be communicatively coupled with the data protection and recordkeeping module 40. The data protection and recordkeeping module 40 may be a storage and logging component configured to receive alert metadata and staff response activity. This module may store timestamps, sensor classifications, and user acknowledgments in a secure, encrypted format. The data protection and recordkeeping module 40 may be implemented locally or via a remote storage mechanism that maintains a historical audit trail.

In the event of a power failure or connectivity issue, the steam room emergency monitoring device 10 may continue to operate using a battery backup 34. The battery backup 34 may be electrically coupled to the privacy-preserving architecture 38, the sensor array 14, and the staff interface and response tools 36. The battery backup 34 may maintain power for a limited duration to allow for alert transmission, local audio prompting, or basic sensor operation until the primary power supply is restored.

The privacy-preserving architecture 38 may also communicate with a usage limiting aid analytics module 50. The usage limiting aid analytics module 50 may track occupancy duration based on sensor presence data and generate warnings or reminders when the monitored session exceeds a predefined time threshold. The usage limiting aid analytics module 50 may compare accumulated session time against configured duration limits and may initiate a soft prompt or a visual indication to notify facility staff or the occupant. The usage limiting aid analytics module 50 may also adjust inactivity detection thresholds based on session duration to increase sensitivity during extended stays.

All outputs generated by the privacy-preserving architecture 38, usage limiting aid analytics module 50, and staff interface and response tools 36 may be routed to the data protection and analytics module 60. The data protection and analytics module 60 may be configured to consolidate system performance metrics, sensor accuracy rates, and alert outcomes. The data protection and analytics module 60 may produce anonymized visualizations or usage reports accessible by facility administrators for operational insight, maintenance planning, or policy development. The data protection and analytics module 60 may be communicatively linked with the staff interface and response tools 36, enabling real-time or scheduled reporting from an integrated interface.

The steam room emergency monitoring device 10, as illustrated in FIG. 2, thereby supports detection, escalation, and recording of emergency conditions through a combination of steam-tolerant hardware and privacy-compliant processing logic. The interconnection of modules allows the system to adapt to real-time conditions, maintain operability during power interruptions, and provide reliable staff alerts without compromising occupant privacy.

Figure 3A:
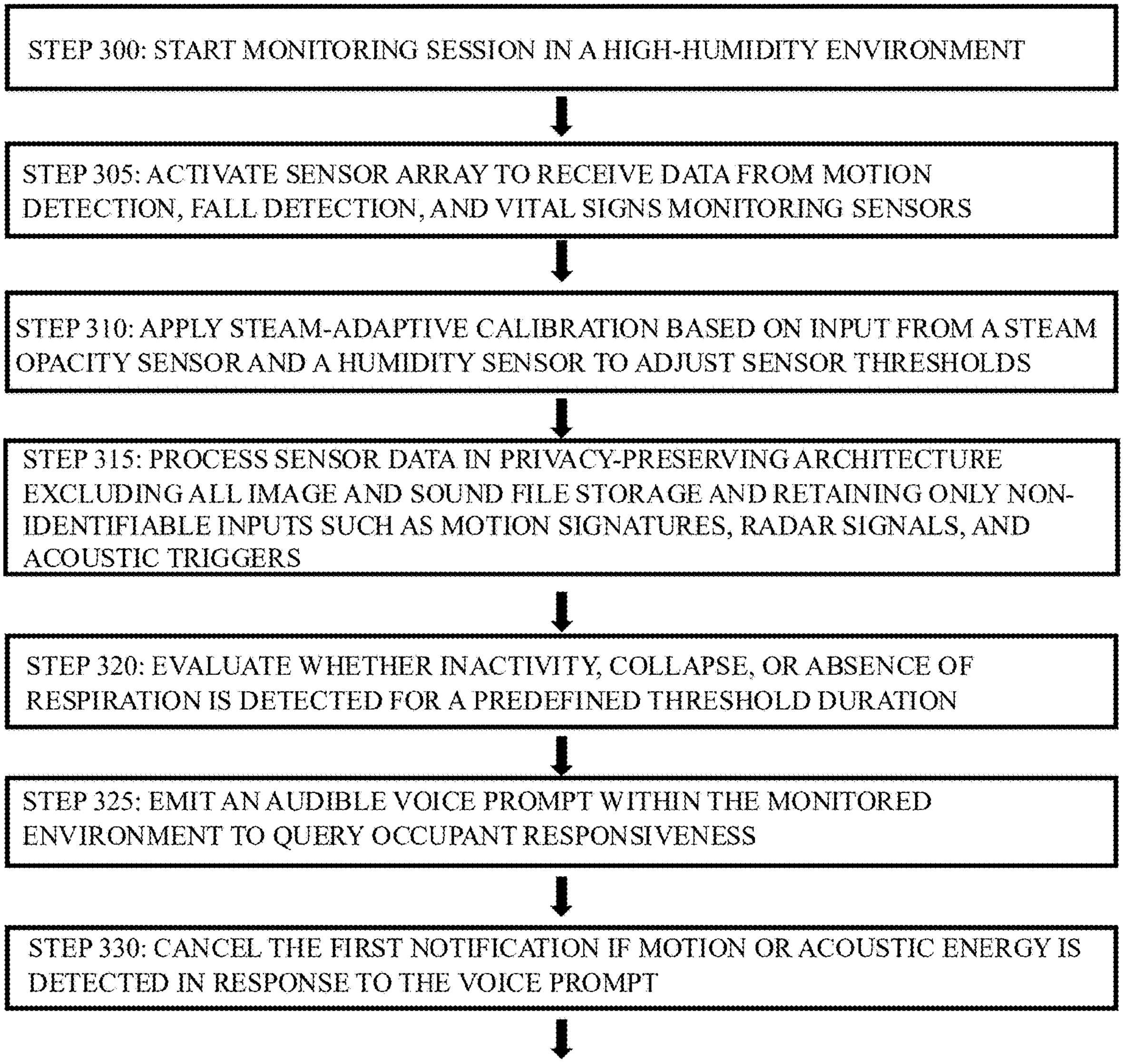
FIG. 3A illustrates an example method workflow for initiating emergency monitoring, detecting risk conditions, and preparing alert logic in a high-humidity environment.

FIG. 3A illustrates an example method workflow for initiating emergency monitoring, detecting risk conditions, and executing alert logic within a high-humidity environment using the steam room emergency monitoring device 10 of FIG. 2. At step 300 of FIG. 3A, the monitoring session may begin when the steam room emergency monitoring device 10 detects the presence of an occupant or receives a trigger to activate its session timer. This activation may occur through passive motion detected by the motion detection module of sensor array 14 of FIG. 2 or through a facility-scheduled automation protocol. Beginning the session allows the privacy-preserving architecture 38 of FIG. 2 to initiate its monitoring logic and begin receiving sensor inputs.

At step 305 of FIG. 3A, the processor 110 of FIG. 1 may execute application instructions 140 of FIG. 1 to activate sensor array 14 of FIG. 2. Sensor array 14 may be configured to collect real-time physiological and positional data from three primary sensing modules: motion detection, fall detection, and vital signs monitoring. The motion detection module may comprise passive infrared sensors, Doppler radar modules, or ultrasonic emitters to detect ongoing occupant movement. The fall detection module may include lidar, ultrasonic ranging, or radar sensors that determine vertical displacement patterns consistent with collapse events. The vital signs monitoring module may use non-contact radar, thermal imaging, or millimeter-wave sensors to identify respiratory micro-movements associated with chest rise and fall.

At step 310 of FIG. 3A, a steam-adaptive calibration module integrated within sensor array 14 of FIG. 2 may process input from a steam opacity sensor and a humidity sensor. The steam opacity sensor may use backscattered light or laser diffraction to estimate the visual density of vapor present in the room, while the humidity sensor may measure relative humidity and temperature. Based on these inputs, the steam-adaptive calibration module may dynamically adjust sensitivity thresholds across the other sensing modules. For example, in dense steam conditions, the calibration logic may reduce false positives by suppressing signal noise or filtering sensor data using adaptive weighting curves stored in memory 120 of FIG. 1.

At step 315 of FIG. 3A, the privacy-preserving architecture 38 of FIG. 2 may process incoming sensor data streams using executable instructions that enforce data minimization principles. The privacy-preserving architecture 38 may exclude all image capture, video storage, or audio recording from the detection process. Instead, the privacy-preserving architecture 38 may rely on non-identifiable signal data, such as thermal contours, radar Doppler patterns, motion vector fields, or acoustic energy bursts. These data types may be temporarily buffered, parsed, and analyzed using algorithmic classifiers without retention or reassembly capabilities. This ensures monitoring functions without collecting personally identifiable information.

At step 320 of FIG. 3A, the privacy-preserving architecture 38 may evaluate whether a risk condition exists based on the continuous absence of occupant activity. The criteria for risk detection may include prolonged inactivity, sudden vertical displacement, or a cessation of detected respiration. Thresholds for each of these conditions may be configured in software and may be evaluated using timestamped sensor data from sensor array 14. When the evaluation indicates that one or more of these conditions has persisted beyond a configured threshold period, such as two minutes for inactivity or 20 seconds for respiratory cessation, the system may transition to an occupant alert phase.

At step 325 of FIG. 3A, the privacy-preserving architecture 38 may issue an audible voice prompt within the monitored steam room environment. The voice prompt may be generated by a speaker within I/O device(s) 130 of FIG. 1 and may use pre-recorded or synthesized speech to query user responsiveness, such as, "You appear inactive. Are you okay?" The privacy-preserving architecture 38 may track whether the occupant responds through sound or movement within a defined window, such as 20 seconds, using acoustic sensors or motion detection input.

At step 330 of FIG. 3A, if motion or acoustic energy is detected in response to the voice prompt, the privacy-preserving architecture 38 may cancel the alert escalation process. Responsive motion may be detected by the motion detection module of sensor array 14, and acoustic response may be detected by microphones or pressure sensors configured to trigger only upon non-sustained loud utterances or noises. Cancellation logic may involve resetting internal timers and restoring the session to active monitoring mode.

Figure 3B:
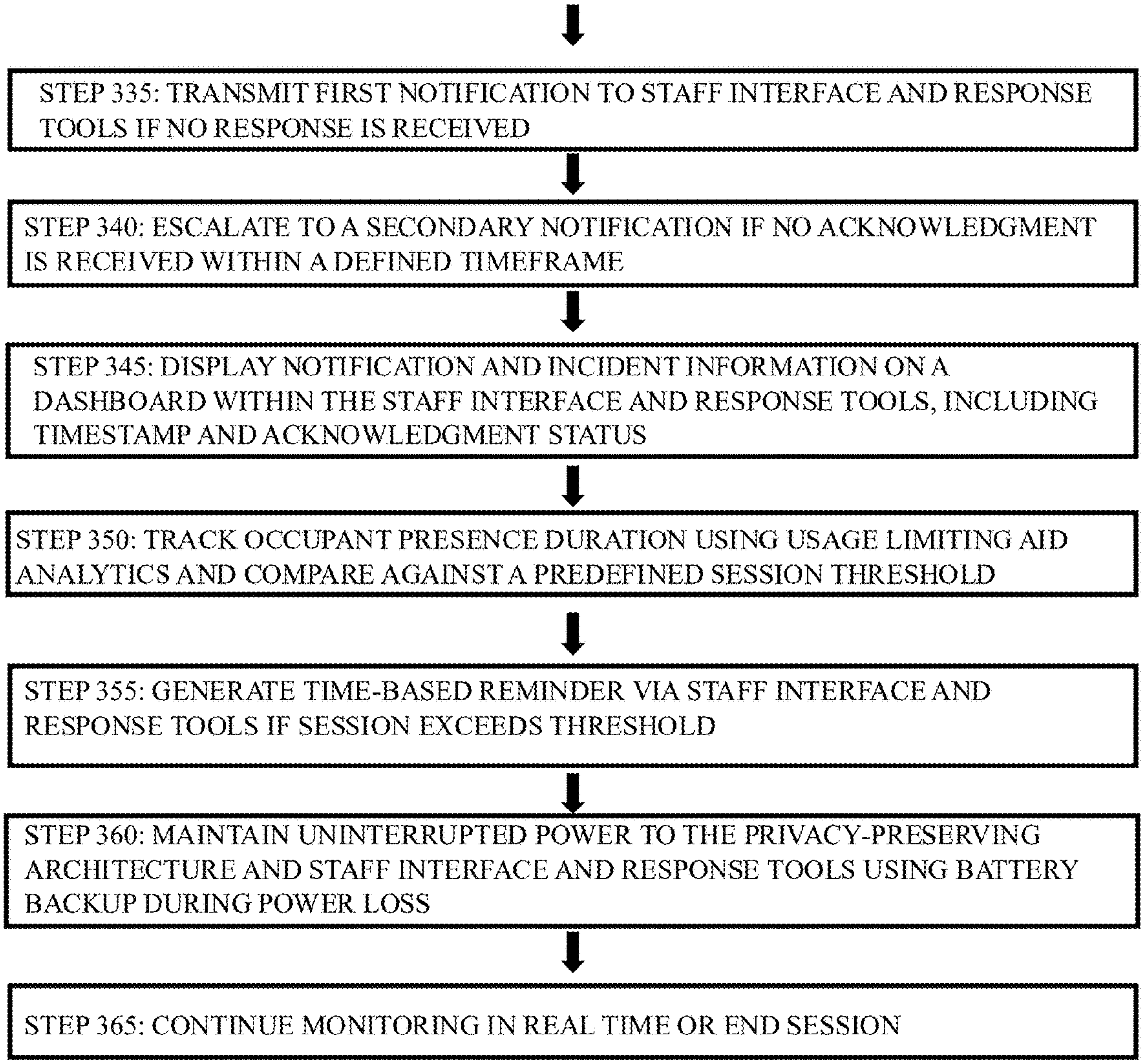
FIG. 3B illustrates a continuation of the method workflow for transmitting alerts, managing response escalation, tracking session duration, and maintaining system power and real-time operation.

FIG. 3B illustrates a continuation of the method workflow shown in FIG. 3A, focusing on alert transmission, escalation, time-based safety analysis, and power continuity. At step 335 of FIG. 3B, if no responsive activity is detected following the voice prompt, the privacy-preserving architecture 38 of FIG. 2 may transmit a first notification to the staff interface and response tools 36 of FIG. 2. The notification may include incident metadata such as room identification number, sensor source, inactivity duration, and timestamp. Transmission may occur over network 190 of FIG. 1 using protocols supported by network interface 165 of FIG. 1.

At step 340 of FIG. 3B, if no acknowledgment of the first notification is received within a configured period, such as 60 seconds, the privacy-preserving architecture 38 may trigger a secondary escalation. The secondary notification may be sent to management-level devices, override systems, or facility-wide broadcast platforms. Escalation logic may be based on acknowledgment status fields stored in data storage 150 of FIG. 1 and managed by application instructions 140 of FIG. 1.

At step 345 of FIG. 3B, the staff interface and response tools 36 may present the incoming notification on a graphical dashboard. The dashboard may include real-time updates for all active monitoring sessions and display incident metadata such as alert type, timestamp, room ID, and acknowledgment state. The interface may be accessible from a desktop, tablet, or mobile computing endpoint such as administrator computing device 185 of FIG. 1.

At step 350 of FIG. 3B, the usage limiting aid analytics module 50 of FIG. 2 may track the total presence duration of the occupant within the monitored environment. Session duration may be calculated based on continuous motion or presence signals and stored in time-indexed arrays for comparison against predefined session thresholds. These thresholds may vary depending on facility policy or occupant category, such as a 20-minute limit for high-temperature exposure.

At step 355 of FIG. 3B, if the presence duration exceeds the configured threshold, the usage limiting aid analytics module 50 may trigger a time-based reminder. This reminder may be transmitted via the staff interface and response tools 36 and may include options for staff to check in or notify the occupant. In some implementations, the reminder may be accompanied by a secondary voice prompt from I/O device(s) 130 of FIG. 1.

At step 360 of FIG. 3B, in the event of a power failure, the battery backup 34 of FIG. 2 may maintain uninterrupted power to the privacy-preserving architecture 38 and staff interface and response tools 36. The battery backup 34 may be configured to provide a minimum of 15-30 minutes of continued operation using rechargeable lithium-polymer or lithium-ion cells. Voltage regulation circuits within the steam room emergency monitoring device 10 may prioritize power delivery to core processing and communication modules.

At step 365 of FIG. 3B, the monitoring session may continue in real time or be terminated if the occupant exits the environment or a manual reset is initiated by facility staff. Session termination may trigger a data logging routine within data protection and recordkeeping module 40 of FIG. 2 and may initiate session summary analytics in data protection and analytics module 60 of FIG. 2. Data retention policies may vary by facility but may include storage for auditing, training, or liability reduction.

The operations depicted in FIG. 3A and FIG. 3B may be repeated as needed across multiple sessions or environments and may be implemented as a finite state machine or event-driven system stored in application instructions 140 of FIG. 1. The logic structure allows the system to react dynamically to risk conditions while maintaining compliance with privacy standards and operational continuity under adverse environmental conditions.

Figure 4A:
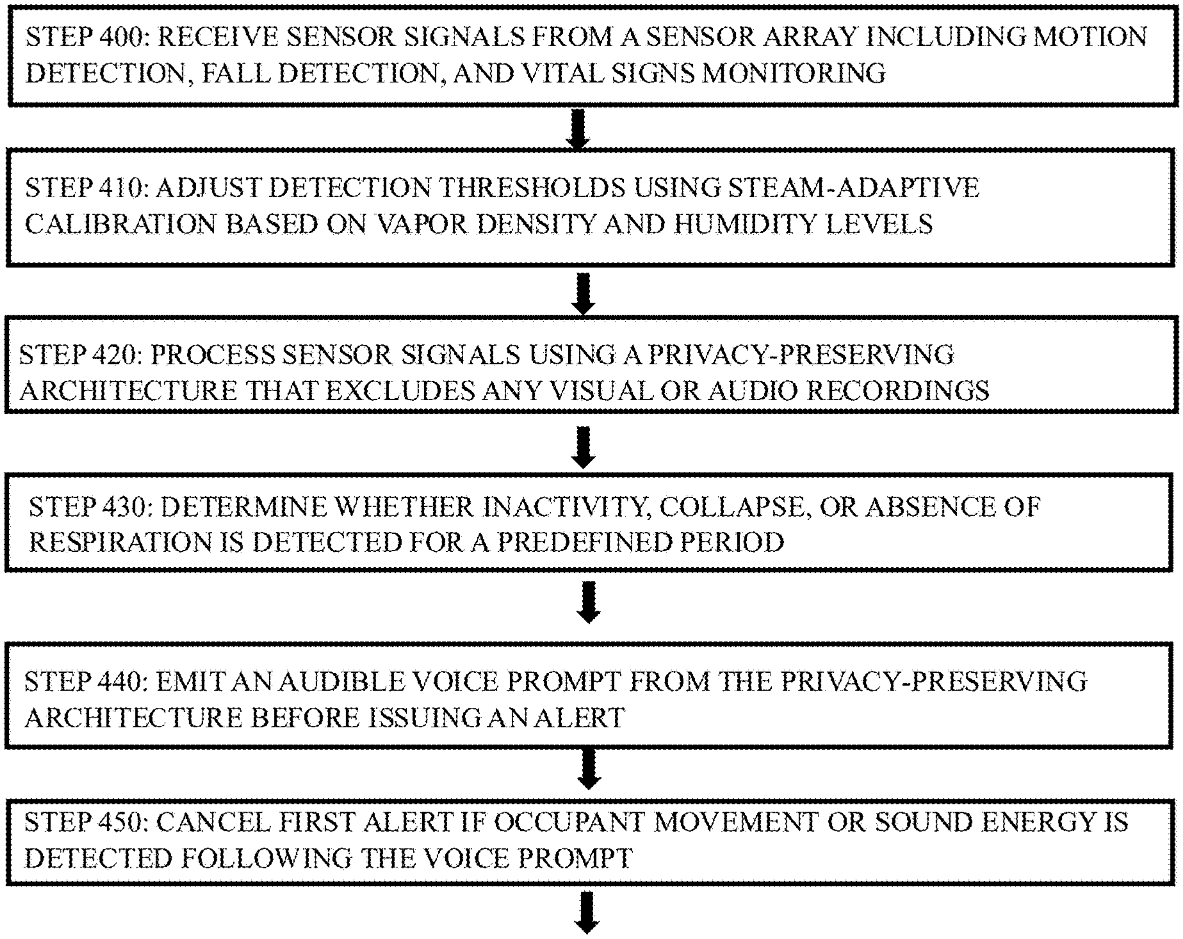
FIG. 4A illustrates an example method for processing sensor data, applying privacy-preserving logic, and initiating conditional alert logic based on occupant responsiveness.

FIG. 4A illustrates a method for processing sensor data and initiating an alert workflow using privacy-preserving logic and environmental adaptation in the steam room emergency monitoring device 10 of FIG. 2. At step 400 of FIG. 4A, the processor 110 of FIG. 1 executes application instructions 140 of FIG. 1 to receive incoming sensor signals from the sensor array 14 of FIG. 2. The sensor array 14 may include three primary modules: the motion detection module, the fall detection module, and the vital signs monitoring module. The motion detection module may include radar or infrared sensors that detect changes in spatial presence and movement. The fall detection module may use directional radar or lidar to detect rapid vertical displacement or impact signatures that indicate an occupant collapse. The vital signs monitoring module may incorporate millimeter-wave radar or passive thermal sensors to detect periodic micro-movements of the chest wall, corresponding to breathing patterns. Signals from each of these modules may be streamed to the privacy-preserving architecture 38 of FIG. 2 for centralized processing.

At step 410 of FIG. 4A, the steam-adaptive calibration module, which resides within sensor array 14 of FIG. 2, adjusts detection thresholds based on vapor density and humidity levels. The steam-adaptive calibration module may receive input from a steam opacity sensor, which uses optical scattering or laser reflectance to detect visual obstruction caused by steam particles. In addition, a humidity sensor may measure relative humidity and ambient temperature. The steam-adaptive calibration module uses this environmental data to modify the sensitivity or filtering parameters of each detection module. For example, it may lower the gain on radar signals when excessive reflection is detected or compensate for thermal diffusion in high-moisture air. These calibration routines may be applied continuously to improve detection reliability throughout each monitoring session.

At step 420 of FIG. 4A, the privacy-preserving architecture 38 of FIG. 2 processes the sensor signals to identify patterns that match criteria for emergency conditions. The privacy-preserving architecture 38 intentionally excludes any module that captures, stores, or transmits visual images or audio recordings. Instead, the architecture is configured to extract features from non-identifiable signal inputs, such as Doppler radar returns, motion vectors, and acoustic pressure spikes. The processor 110 of FIG. 1 interprets these signals using logic rules or machine learning classifiers to distinguish normal occupant behavior from emergency scenarios. The privacy-preserving architecture 38 may buffer signals temporarily in memory 120 of FIG. 1 without storing raw media files, thereby maintaining compliance with privacy expectations in spa and wellness environments.

At step 430 of FIG. 4A, the privacy-preserving architecture 38 determines whether inactivity, collapse, or absence of respiration has occurred for a predefined period. These evaluation thresholds may be stored in data storage 150 of FIG. 1 and may be adjustable by facility administrators. The system may compare the duration of inactivity or the absence of respiratory signals against these thresholds. For example, the system may initiate further action if no motion is detected for 3 minutes or if no respiratory micro-movement is observed for 30 seconds. Detection logic may rely on time-indexed sensor data and may be configured to reduce false positives by requiring confirmation from multiple sensor types.

At step 440 of FIG. 4A, the privacy-preserving architecture 38 generates and emits an audible voice prompt within the steam room. This prompt may originate from a speaker housed in I/O device(s) 130 of FIG. 1. The voice prompt may be a recorded or synthesized message, such as "You appear inactive. Are you okay?" The purpose of this prompt is to assess occupant responsiveness without requiring physical contact or human intervention. The privacy-preserving architecture 38 uses this prompt as a conditional checkpoint before transmitting alerts to staff.

At step 450 of FIG. 4A, the privacy-preserving architecture 38 monitors for occupant movement or sound energy following the voice prompt. If the motion detection module or an acoustic energy detector within the sensor array 14 of FIG. 2 identifies a response signal above a defined sensitivity threshold, the system cancels the pending alert. Responsive signals may include deliberate movement, shifting posture, verbal sounds, or coughing. These signals may be interpreted in real time and cause the privacy-preserving architecture 38 to return to passive monitoring mode while maintaining a log of the query and its resolution.

Figure 4B:
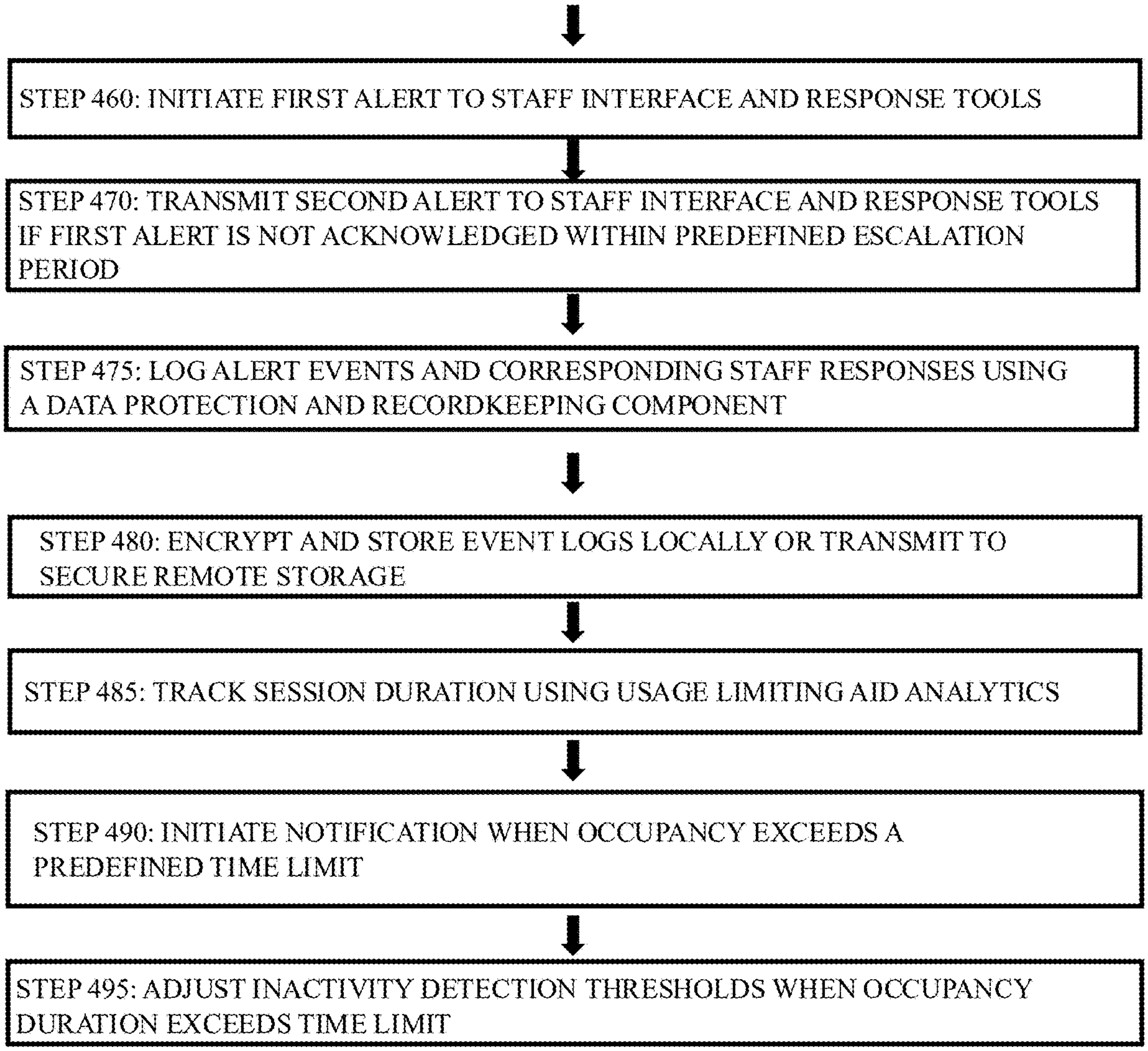
FIG. 4B illustrates a continuation of the method for escalating alerts, logging response events, tracking session duration, and adapting detection thresholds based on occupancy limits.

FIG. 4B illustrates a continuation of the method in FIG. 4A, focusing on alert transmission, escalation, data logging, and time-based safety monitoring. At step 460 of FIG. 4B, when no responsive activity is detected following the voice prompt, the privacy-preserving architecture 38 initiates a first alert to staff interface and response tools 36 of FIG. 2. The alert includes metadata such as session ID, location, sensor condition flags, and a timestamp of the last detected activity. This information is transmitted via network interface 165 of FIG. 1 through network 190 of FIG. 1 to administrator computing device 185 of FIG. 1.

At step 470 of FIG. 4B, if the first alert is not acknowledged within a predefined escalation period, such as 60 seconds, the privacy-preserving architecture 38 transmits a second alert. This secondary alert may be routed to facility management or emergency protocols. The system may use a parallel communication channel to ensure redundancy, such as a mobile push notification or a facility-wide intercom broadcast. The escalation parameters may be set in configuration files accessed by processor 110 of FIG. 1 and may be updated dynamically based on system usage patterns.

At step 475 of FIG. 4B, the system logs alert events and any staff responses using the data protection and recordkeeping module 40 of FIG. 2. The data protection and recordkeeping module 40 may include structured log tables that store event type, response time, user ID, and resolution status. These records are encrypted and stored either in local memory or in data storage 150 of FIG. 1. Logging may occur automatically at each step of the response workflow and may be used to demonstrate operational compliance or investigate incident handling.

At step 480 of FIG. 4B, the data protection and recordkeeping module 40 encrypts event log files and stores them locally or transmits them to a secure remote storage server. Remote storage may use a cloud-based system configured with secure access credentials and encrypted network protocols. The system may employ key rotation, access control lists, or blockchain-based verification depending on facility policy. Logs may be scheduled for periodic upload or triggered immediately following critical alerts.

At step 485 of FIG. 4B, the usage limiting aid analytics module 50 of FIG. 2 tracks the duration of occupant presence within the monitored steam room. This module may calculate elapsed time based on motion signals received from sensor array 14 of FIG. 2. Duration tracking may begin when session initialization occurs at step 300 of FIG. 3A and continue until the occupant leaves or staff terminate the session. Time logs may be stored in session-level records to support safety enforcement and occupancy reporting.

At step 490 of FIG. 4B, the usage limiting aid analytics module 50 initiates a notification when the occupancy duration exceeds a predefined time limit. The time threshold may be set by facility rules or health guidelines, such as 20 minutes for steam room exposure. When the threshold is exceeded, the usage limiting aid analytics module 50 sends a reminder to staff interface and response tools 36 and may optionally trigger a voice prompt within the steam room. This serves as a precautionary measure against heat-related stress or dehydration.

At step 495 of FIG. 4B, the privacy-preserving architecture 38 adjusts inactivity detection thresholds when the monitored session exceeds the configured time limit. For example, if an occupant remains in the room beyond the standard session duration, the system may reduce the tolerance for inactivity before triggering an alert. These adjustments are executed by the processor 110 of FIG. 1 using modified parameters stored in memory 120 of FIG. 1 and managed by application instructions 140 of FIG. 1. Adjusted thresholds ensure heightened sensitivity during extended occupancy and increase the likelihood of detecting fatigue, dizziness, or loss of consciousness.

The workflow illustrated in FIG. 4A and FIG. 4B enables the steam room emergency monitoring device 10 of FIG. 2 to perform continuous risk assessment, initiate conditional alerts, adapt to environmental variables, and maintain accurate records. The system operates autonomously through software-defined logic while minimizing invasiveness and preserving user privacy.

Figure 5:
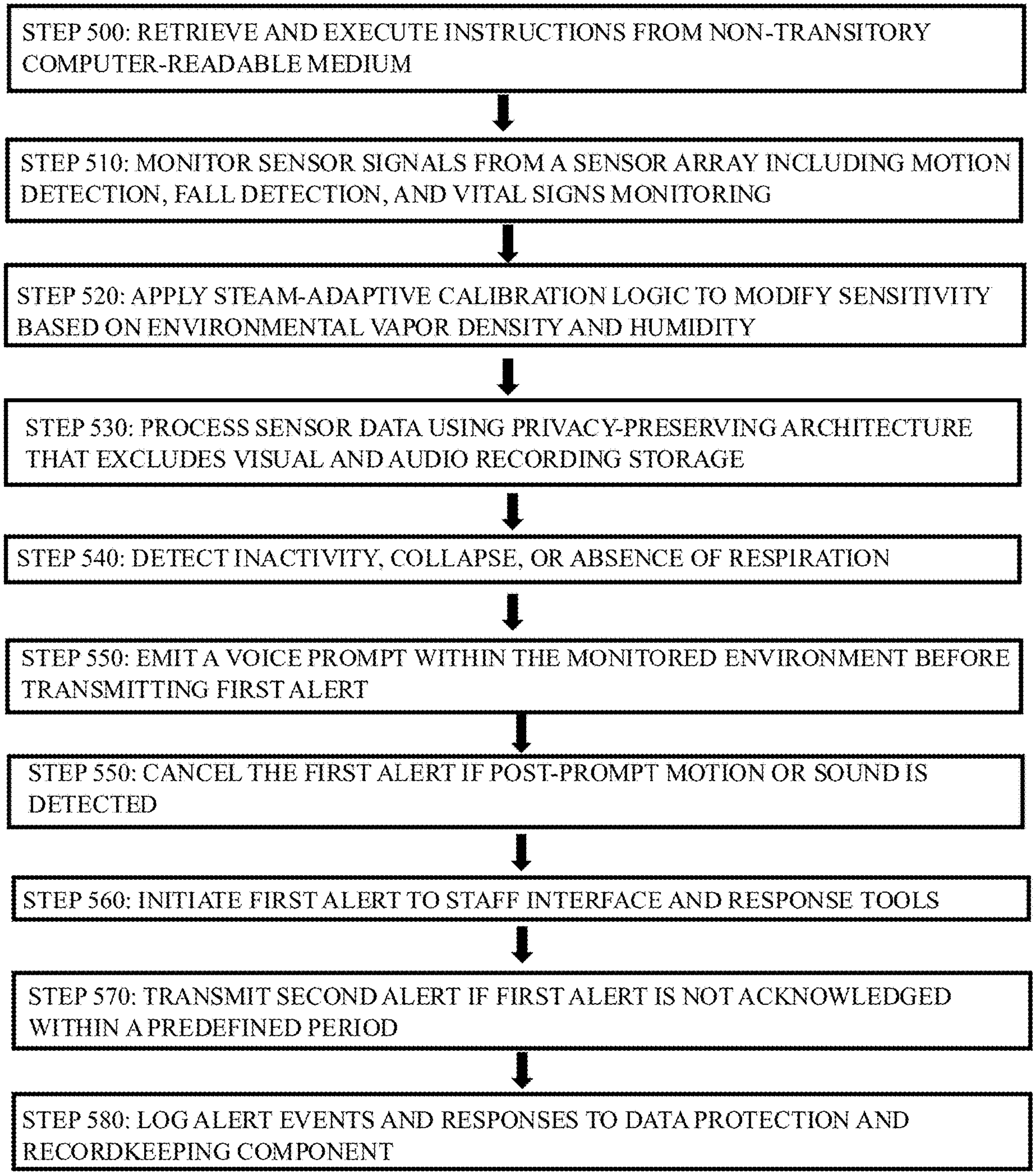
FIG. 5 illustrates a method for executing emergency monitoring instructions from a computer-readable medium.

FIG. 5 illustrates a method for executing emergency monitoring instructions stored on a non-transitory computer-readable medium, such as application instructions 140 of FIG. 1, as performed by the steam room emergency monitoring device 10 of FIG. 2. At step 500 of FIG. 5, processor 110 of FIG. 1 retrieves and executes a set of computer-readable instructions from a non-transitory medium, such as memory 120 or data storage 150 of FIG. 1. These instructions define the logic operations and sensor processing workflows used by the privacy-preserving architecture 38 of FIG. 2, including real-time analysis, adaptive calibration, and conditional alert generation. The medium may be an embedded flash memory chip, solid-state storage, or remote configuration server accessed through network interface 165 of FIG. 1.

At step 510 of FIG. 5, the processor initiates continuous monitoring of sensor signals from the sensor array 14 of FIG. 2. The sensor array 14 includes motion detection, fall detection, and vital signs monitoring modules that provide real-time input to the system. The motion detection module may use radar or infrared to detect occupant movement. The fall detection module may evaluate rapid vertical displacement using lidar or directional accelerometers. The vital signs monitoring module may detect periodic chest expansion through micro-radar or passive thermal sensors. Each sensor transmits its data as an input stream to the privacy-preserving architecture 38 for further evaluation.

At step 520 of FIG. 5, the steam-adaptive calibration module within sensor array 14 applies calibration logic based on vapor density and humidity conditions. The module may use a steam opacity sensor and humidity sensor to capture environmental variables and feed these values into the detection thresholds applied by the motion, fall, and respiration monitoring modules. For example, when vapor density exceeds a predefined value, the steam-adaptive calibration module may reduce radar sensitivity or increase temporal averaging to mitigate signal noise. These adjustments are executed dynamically and continuously during the monitoring session.

At step 530 of FIG. 5, the privacy-preserving architecture 38 processes the incoming sensor data using logic that explicitly excludes visual and audio recording storage. Instead of capturing images or retaining raw sound files, the system analyzes abstracted sensor features such as movement vectors, radar echo delays, or acoustic energy spikes.

These features are processed by algorithms embedded in application instructions 140 of FIG. 1, which determine whether the data patterns meet the threshold for triggering an alert.

At step 540 of FIG. 5, the privacy-preserving architecture 38 determines whether inactivity, collapse, or absence of respiration has occurred. These determinations may be based on consecutive time intervals of no motion, measured loss of vertical position, or absence of periodic vital sign micro-movements. The analysis may compare live data to configurable detection thresholds stored in memory 120 of FIG. 1. When the thresholds are met or exceeded, the system prepares to initiate a warning protocol.

At step 550 of FIG. 5, the privacy-preserving architecture 38 emits a voice prompt into the monitored environment. The voice prompt may be delivered through a speaker housed in I/O device(s) 130 of FIG. 1 and may consist of a pre-recorded or synthesized query such as "You appear inactive. Are you okay?" The purpose of this prompt is to assess occupant responsiveness and provide an opportunity for manual override of the alert process. The prompt is generated only when alert criteria are met but before escalation begins.

Still within step 550 of FIG. 5, if motion or sound is detected after the voice prompt, the privacy-preserving architecture 38 cancels the first alert. Responsive input may be detected by the motion detection module, which senses occupant movement, or by an acoustic pressure sensor that registers sound energy above a defined decibel threshold. When such input is received, the system terminates the alert workflow and resumes normal monitoring, while optionally logging the event for review.

At step 560 of FIG. 5, if no motion or sound is detected in response to the voice prompt, the privacy-preserving architecture 38 initiates the first alert to staff interface and response tools 36 of FIG. 2. The alert may include incident metadata such as session ID, timestamp of last detected activity, sensor state, and environmental conditions. The alert is transmitted over network 190 of FIG. 1 using protocols such as Wi-Fi or Ethernet, and is displayed on a dashboard accessible via administrator computing device 185 of FIG. 1.

At step 570 of FIG. 5, if the first alert is not acknowledged by a staff member within a predefined time window, such as 60 seconds, the privacy-preserving architecture 38 transmits a second alert. This secondary alert may target alternate personnel, such as a manager, or may activate additional channels like SMS notifications or a facility-wide paging system. Escalation logic may be defined in configuration files accessed by processor 110 of FIG. 1 and may vary depending on staff availability or risk classification.

At step 580 of FIG. 5, the system logs both the alert events and any staff responses using the data protection and record-keeping module 40 of FIG. 2. The module may store structured log entries that include response time, staff user ID, alert outcome, and environmental parameters. These entries are stored in encrypted format on local memory or uploaded to secure cloud storage, depending on system settings. The log data supports compliance tracking, quality assurance, and operational audits.

The method illustrated in FIG. 5 enables the steam room emergency monitoring device 10 of FIG. 2 to operate as a software-driven emergency detection system that processes sensor inputs, evaluates environmental conditions, and coordinates alert protocols using privacy-compliant architecture. Each step described in FIG. 5 is executed by computer hardware in communication with sensor subsystems and staff endpoints, ensuring that risk events are detected and addressed efficiently while preserving occupant anonymity.

The foregoing detailed description has set forth various embodiments of the disclosed system and method for emergency monitoring in high-humidity environments. While specific configurations, components, and steps have been described to enable understanding of the subject matter, those skilled in the art will recognize that modifications, additions, and substitutions may be made without departing from the scope of the claimed subject matter. Elements described in one embodiment may be combined with or substituted for elements described in another. The structures and functions described may be implemented using software, firmware, hardware, or any combination thereof.

The terminology used herein is for the purpose of describing particular examples and is not intended to be limiting. The scope of the claims is not intended to be limited to the specific examples disclosed in the specification. Instead, the claims are intended to cover all features, structures, and methods that fall within the scope of the claimed subject matter as defined by the claims and their equivalents.

What is claimed is:

1. A system for monitoring and responding to medical emergencies in high-humidity environments, the system comprising:

a processor configured to execute computer-executable instructions;

a memory coupled to the processor and storing the computer-executable instructions;

a sensor array configured to receive data from a plurality of sensors, including motion detection, fall detection, and vital signs monitoring;

a steam-adaptive calibration within the sensor array configured to dynamically adjust detection thresholds based on environmental parameters including vapor density and humidity levels;

a privacy-preserving architecture configured to initiate a first notification to staff interface and response tools when inactivity, collapse, or absence of respiration is detected for a predefined threshold period;

wherein the privacy-preserving architecture is further configured to transmit a secondary notification to the staff interface and response tools if the first notification is not acknowledged within a predetermined escalation period;

wherein the privacy-preserving architecture processes only non-identifiable inputs including motion signatures, radar signals, or acoustic triggers without storing any visual or audio recordings;

wherein the system is configured to operate in real time and provide emergency alerts while maintaining occupant privacy.

2. The system of claim 1, wherein the steam-adaptive calibration within the sensor array comprises computer-executable instructions to adjust sensor sensitivity based on signals received from a steam opacity sensor and a humidity sensor.

3. The system of claim 1, wherein the privacy-preserving architecture comprises executable instructions to emit an audible voice prompt within the monitored environment prior to initiating the first notification.

4. The system of claim 1, wherein the privacy-preserving architecture is configured to send notifications to at least one mobile device associated with facility staff when the staff interface and response tools do not respond within sixty seconds.

5. The system of claim 1, further comprising usage limiting aid analytics configured to track a duration of occupant presence within the monitored environment and generate a time-based reminder upon exceeding a predefined session threshold.

6. The system of claim 1, wherein the privacy-preserving architecture excludes all image and sound file storage and processes sensor data solely for real-time event detection without retention of identifiable information.

7. The system of claim 1, further comprising a battery backup configured to provide uninterrupted power to the privacy-preserving architecture and the staff interface and response tools during loss of main power.

8. The system of claim 1, wherein the privacy-preserving architecture is further configured to cancel the first notification when motion or audio energy is detected in response to the audible voice prompt.

9. The system of claim 1, wherein the staff interface and response tools comprise a dashboard configured to display incident type, timestamp, and acknowledgment status.

10. A method for detecting and escalating medical emergencies in a high-humidity environment, comprising:

receiving sensor signals from a sensor array including motion detection, fall detection, and vital signs monitoring;

adjusting detection thresholds using a steam-adaptive calibration based on vapor density and humidity levels;

processing sensor signals using a privacy-preserving architecture that excludes any visual or audio recordings;

initiating a first alert to staff interface and response tools upon detecting inactivity, collapse, or absence of respiration for a predefined period;

transmitting a second alert to the staff interface and response tools when no acknowledgment is received within a predefined escalation period.

11. The method of claim 10, further comprising emitting an audible voice prompt from the privacy-preserving architecture before the first alert is issued.

12. The method of claim 10, further comprising canceling the first alert when occupant movement or sound energy is detected following the audible voice prompt.

13. The method of claim 10, further comprising logging alert events and corresponding staff responses using a data protection and recordkeeping component.

14. The method of claim 13, further comprising encrypting and storing event logs in local memory or transmitting the logs to a secure remote storage location.

15. The method of claim 10, further comprising tracking session duration using usage limiting aid analytics and initiating a notification when occupancy exceeds a predefined time limit.

16. The method of claim 15, further comprising adjusting inactivity detection thresholds when session duration exceeds the predefined time limit.

17. A non-transitory computer-readable medium storing instructions that, when executed by a processor, cause the processor to:

monitor signals from a sensor array including motion detection, fall detection, and vital signs monitoring;

apply steam-adaptive calibration logic to modify sensitivity based on environmental vapor density and humidity;

process sensor signals using a privacy-preserving architecture that excludes any storage of visual or audio recordings;

initiate a first alert to staff interface and response tools upon detecting inactivity, collapse, or absence of respiration;

transmit a second alert if the first alert is not acknowledged within a predefined period.

18. The non-transitory computer-readable medium of claim 17, wherein the instructions further cause the processor to emit a voice prompt within the monitored environment before the first alert is transmitted.

19. The non-transitory computer-readable medium of claim 17, wherein the instructions further cause the processor to log alert events and responses to a data protection and recordkeeping component.

20. The non-transitory computer-readable medium of claim 17, wherein the instructions further cause the processor to cancel the first alert when post-prompt movement or sound is detected.

* * * * *